United States Patent
Olesen et al.

(12)

(10) Patent No.: US 8,807,923 B2
(45) Date of Patent: Aug. 19, 2014

(54) ACCESS APPARATUS FOR A WIND TURBINE AND METHOD OF USING SAME

(75) Inventors: Kennet Ryan Olesen, Hadsten (DK); Torben Friis Baun, Århus N (DK); Jesper Lykkegaard Andersen, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 653 days.

(21) Appl. No.: 13/021,993

(22) Filed: Feb. 7, 2011

(65) Prior Publication Data

US 2011/0182750 A1 Jul. 28, 2011

(51) Int. Cl.
*F03D 9/00* (2006.01)
*F03D 11/00* (2006.01)
*F03D 1/00* (2006.01)

(52) U.S. Cl.
CPC ............... *F03D 1/003* (2013.01); *Y02E 10/726* (2013.01); *Y02E 10/721* (2013.01)
USPC ........... 415/118; 416/244 R; 415/4.3; 415/4.5

(58) Field of Classification Search
USPC ............ 415/4.1, 4.3, 4.5, 118, 108, 115, 116; 416/62, 142, 244 R, DIG. 6; 290/43, 54, 290/55
See application file for complete search history.

(56) References Cited

U.S. PATENT DOCUMENTS

| | | | |
|---|---|---|---|
| 4,357,860 A * | 11/1982 | Krzak | 454/71 |
| 5,990,568 A * | 11/1999 | Hildingsson et al. | 290/55 |
| 6,055,692 A * | 5/2000 | Pell et al. | 14/71.5 |
| 6,285,090 B1 * | 9/2001 | Brutsaert et al. | 290/55 |
| 6,357,549 B1 | 3/2002 | Brennan et al. | |
| 7,385,306 B2 * | 6/2008 | Casazza et al. | 290/55 |
| 7,789,252 B2 | 9/2010 | Dehlsen et al. | |
| 2003/0071469 A1 | 4/2003 | Becker | |

(Continued)

FOREIGN PATENT DOCUMENTS

| | | |
|---|---|---|
| DE | 767003 C | 4/1951 |
| DE | 7623019 U1 | 5/1978 |

(Continued)

OTHER PUBLICATIONS

Frank G. Bergenholtz; 1st Technical Examination and Search Report issued in corresponding Denmark Application No. PA 2011 70256; Jan. 6, 2012; 4 pages; Denmark Patent and Trademark Office.

*Primary Examiner* — Edward Look
*Assistant Examiner* — William Grigos
(74) *Attorney, Agent, or Firm* — Wood, Herron & Evans, LLP (57) ABSTRACT

A wind turbine having a tower and a rotor hub that is supported by the tower. At least one blade extends from the rotor hub, and a nacelle is located proximate the rotor hub. The wind turbine also has a transport conduit that selectively provides communication between an interior of the nacelle and an interior of the rotor hub. The transport conduit may have a collapsed condition in which the transport conduit is located completely within the nacelle, and an extended condition in which the transport conduit partially extends into the interior of the rotor hub. In a specific embodiment, the transport conduit is a telescoping structure. A method for using the transport conduit includes accessing the interior of the nacelle to position an object therein and transporting the object to the interior of the rotor hub using the transport conduit.

16 Claims, 7 Drawing Sheets

(56) References Cited

U.S. PATENT DOCUMENTS

| | | |
|---|---|---|
| 2006/0151767 A1* | 7/2006 | Wobben .................. 254/334 |
| 2007/0056801 A1 | 3/2007 | Iversen |
| 2007/0200103 A1 | 8/2007 | Viladomiu i Guarro et al. |
| 2008/0012346 A1* | 1/2008 | Bertolotti .................. 290/55 |
| 2008/0245756 A1* | 10/2008 | Dehlsen et al. ............... 212/224 |
| 2008/0257844 A1 | 10/2008 | Gonzalez et al. |
| 2010/0021278 A1 | 1/2010 | Stegemann et al. |
| 2010/0111633 A1 | 5/2010 | Pedersen |
| 2010/0135792 A1* | 6/2010 | Niehues .......................... 416/1 |
| 2011/0064578 A1* | 3/2011 | Bertolotti ..................... 416/131 |

FOREIGN PATENT DOCUMENTS

| | | |
|---|---|---|
| EP | 1 291 521 | 3/2003 |
| EP | 1291521 A1 | 3/2003 |
| EP | 2147885 A1 | 1/2010 |
| EP | 2 149 700 | 2/2010 |
| JP | 200894628 A | 4/2008 |
| WO | 2007107817 A1 | 9/2007 |
| WO | 2008069818 A1 | 6/2008 |
| WO | 2009121792 A2 | 10/2009 |

* cited by examiner

ACCESS APPARATUS FOR A WIND TURBINE AND METHOD OF USING SAME

TECHNICAL FIELD

The present invention relates generally to wind turbines and, more particularly, to an access apparatus that facilitates access into certain areas of the wind turbine.

BACKGROUND

Wind turbines have at least one blade, and typically a plurality of blades, extending from a rotor hub, and a nacelle containing the electrical power-generating components of the wind turbine. Sometimes it is necessary to perform maintenance or repair tasks within the rotor hub, in which case replacement components and sometimes personnel need to be transported into the interior of the rotor hub. Conventionally, these replacement components and/or personnel are transported into the interior of the rotor hub through an opening at the top of the rotor hub, using a crane.

These conventional methods are complex and time-consuming. It would be desirable, therefore, to provide methods and apparatus that improve access into the interior of the rotor hub of a wind turbine and which facilitate the transportation of repair components and/or personnel into that space.

SUMMARY

In one embodiment of the invention, a wind turbine is provided having a tower and a rotor hub that is supported by the tower. At least one blade, and preferably a plurality of blades, extends from the rotor hub, and a nacelle is coupled to the tower and located proximate the rotor hub. The wind turbine also has a transport conduit that selectively provides communication between an interior of the nacelle and an interior of the rotor hub.

The transport conduit may have a first, collapsed condition in which the transport conduit is located completely within the nacelle, and a second, extended condition in which the transport conduit partially extends into the interior of the rotor hub. In a specific embodiment, the transport conduit is a telescopic structure which may have at least two elongate components that are telescopically movable relative to one another. In one embodiment, the transport conduit has three elongate components, wherein one of the elongate components may be fixed to the nacelle while the other two telescoping components may be coupled to the fixed component in a cantilevered fashion. In one embodiment, at least one of the elongate components defines a closed channel and an exterior of the closed channel may be exposed to an exterior of the wind turbine when in the extended condition. At least one of the elongate components may also define an open channel.

Additionally, the transport conduit may include a channel and a cart that is configured to receive objects thereon. The cart is configured to move along the channel for moving the objects between the nacelle and the rotor hub. The channel, in some embodiments, has a U-shaped profile. The transport conduit may extend through an aperture in the rotor hub. Additionally, the transport conduit may extend through an aperture in a wall of the nacelle. A reinforcement may be present in the wall of the nacelle and/or hub, adjacent the apertures formed therein.

In another embodiment, a method is provided for transporting an object into an interior of a rotor hub of a wind turbine, with the wind turbine also having at least one blade that extends from the rotor hub, a tower supporting the rotor hub, and a nacelle coupled to the tower and located proximate the rotor hub. The method includes accessing the interior of the nacelle so as to position the object in the nacelle, and moving the object along a transport conduit that communicates an interior of the nacelle with an interior of the rotor hub.

The method may include telescopically extending the transport conduit into the interior of the rotor hub. Additionally or alternatively, the method may include collapsing the transport conduit so as to be contained entirely within the interior of the nacelle. Moving the object along the transport conduit includes, in some embodiments, supporting an object on a cart and moving the cart along a channel that is defined by the transport conduit to thereby move the object between the nacelle and the rotor hub.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
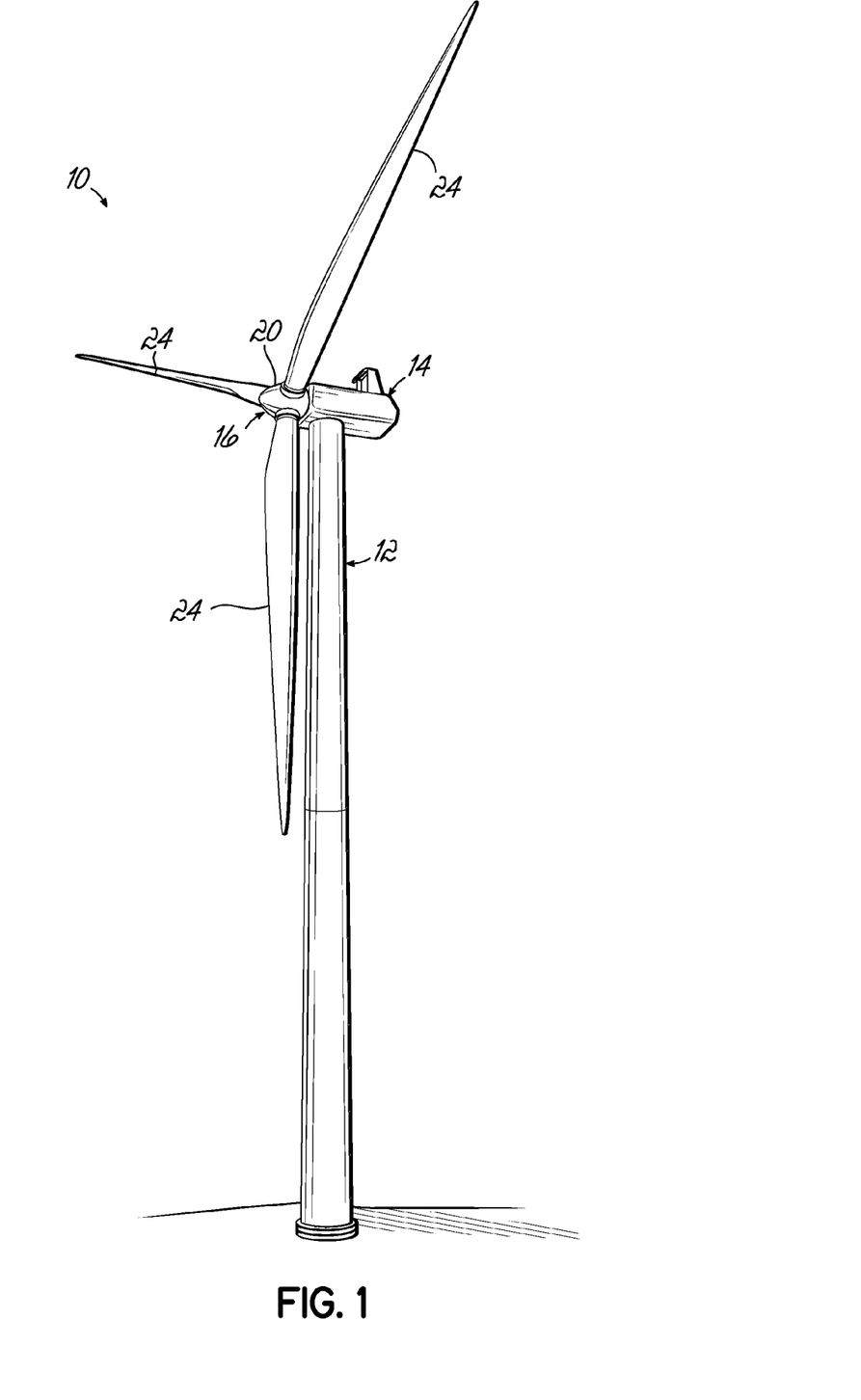
FIG. 1 is a perspective view of a wind turbine.

With reference to the figures, and more specifically to FIG. 1, an exemplary wind turbine 10 includes a tower 12, a nacelle 14 at the apex of the tower 12, and a rotor 16 operatively coupled to a generator (not shown) housed inside the nacelle 14. The wind turbine 10, which is represented as a horizontal-axis wind turbine, has the ability to convert the kinetic energy of the wind into electrical energy. In addition to the generator, the nacelle 14 houses various components needed to convert the wind energy into electrical energy and also various components needed to operate and optimize the performance of the wind turbine 10. The tower 12 supports the load presented by the nacelle 14, rotor 16, and other wind turbine components housed inside the nacelle 14. The tower 12 of the wind turbine 10 operates to elevate the nacelle 14 and rotor 16 to a height above ground level or sea level, as may be the case, at which wind with faster moving air characterized by smoother and less turbulent air currents is typically found.

The rotor 16 includes a central hub 20 and at least one blade 24 coupled to and extending outwardly from the central hub 20. In the representative embodiment, the rotor 16 includes three blades 24 at locations distributed about the circumference of the central hub 20. The blades 24 are configured to interact with the passing air flow to produce lift that causes the rotor 16 to spin about its longitudinal axis. Each of the blades 24 may be connected to the central hub 20 through a pitch mechanism that allows the blade to pitch under control of a pitch controller located inside the central hub 20. Wind exceeding a minimum level will activate the rotor 16 and allow it to rotate in a substantially perpendicular direction to the wind. The rotation movement is converted to electric power by the generator and is usually supplied to the utility grid as known to a person having ordinary skill in the art.

Figure 2:
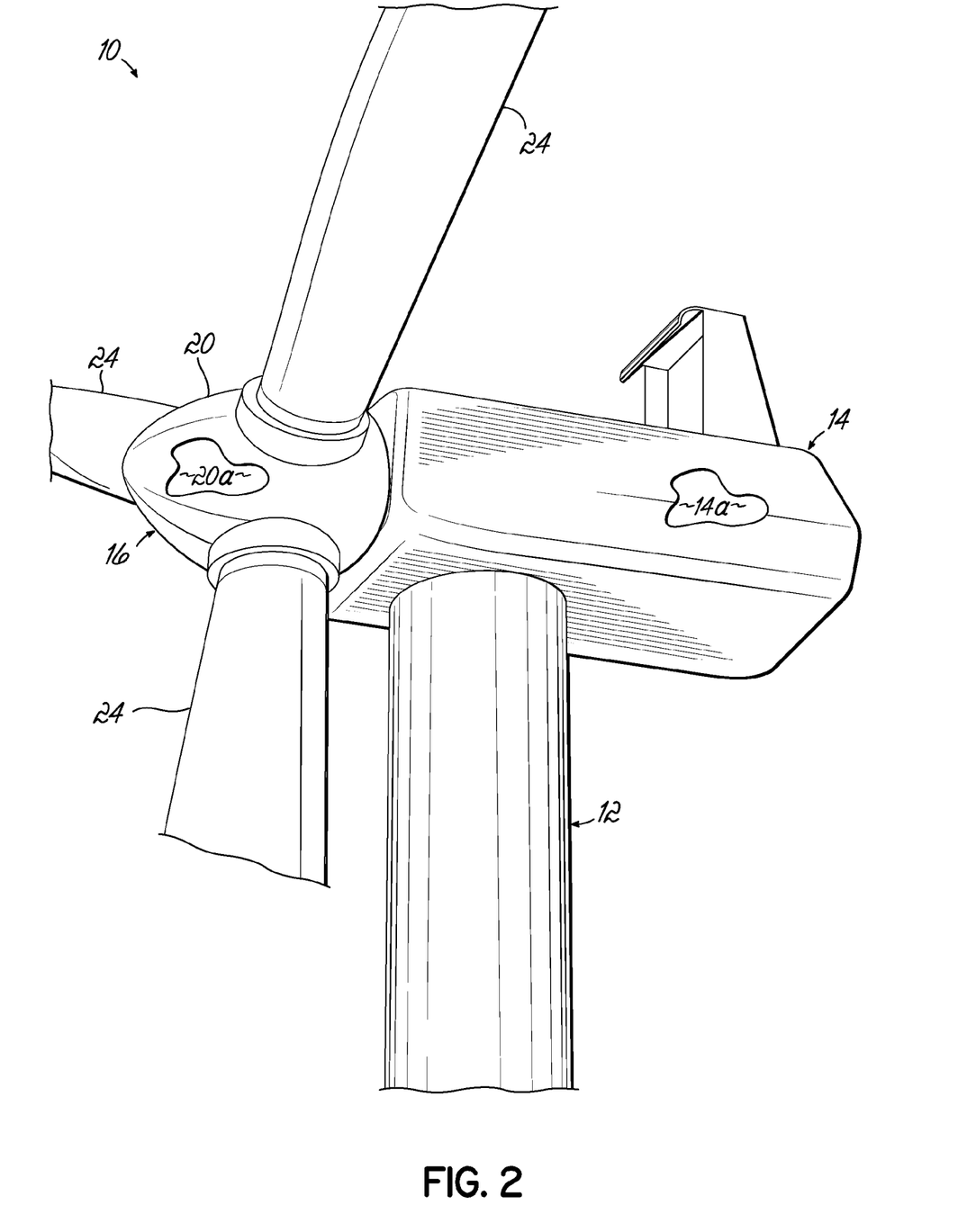
FIG. 2 is a perspective view of an exemplary rotor hub and nacelle of the wind turbine of FIG. 1.

With continued reference to FIG. 1, and further referring to FIG. 2, the central hub 20 of rotor 16 houses several components needed to operate the wind turbine 10. As discussed above, for example, the central hub 20 may house in its interior a pitch controller. Further, other components may be located inside the central hub 20 and may be electrical, mechanical, or electromechanical. These additional components are not mentioned nor described in detail insofar as they form no part of the current invention.

Conventionally, the interior 20a of the central hub 20 is accessed through an access opening (not shown) in the hub 20. For example, the central hub 20 may be oriented in a stopped position such that the access opening is positioned upwardly and adjacent a top surface of the nacelle 14. In accordance with an aspect of the invention, access to the interior 20a of the central hub 20 is via another route. More particularly, in an exemplary embodiment, the interior 20a of the central hub 20 may be accessed through the interior 14a of the nacelle 14. Of course, the interior 14a of the nacelle 14 may be accessed through conventional means, such as via the tower 12.

Additionally, access into the interior 20a of the central hub 20 is facilitated via an access apparatus, which in one embodiment may take the form of a transport conduit, generally designated by the numeral 25, and which provides selective communication between the interior 14a of the nacelle 14 and the interior 20a of the central hub 20. As discussed in more detail below, the transport conduit 25 has a first, extended condition in which at least a portion thereof extends into the interior 20a of the central hub 20, and a second, collapsed condition in which the transport conduit 25 is stored completely in the interior 14a of nacelle 14 when not in use.

To this end, in one embodiment, the transport conduit 25 is a telescopic structure having two or more elongate components that are telescopically movable relative to one another. In the illustrated embodiment, for example, the transport conduit 25 has three such elongate components 26, 27, 28 that are telescopically collapsed when not in use so as to be located completely within the nacelle 14. An embodiment having three telescoping components is exemplary and it should be realized that in alternative embodiments, transport conduit 25 may include two components or more than three components and be within the scope of the invention. In the collapsed condition (FIG. 4), each of the elongate components 26, 27, 28 has its respective longitudinal ends generally coincide with the longitudinal ends of the other elongate components 26, 27, 28, as shown in FIGS. 4 and 5. In the extended condition of the transport conduit 25 (FIGS. 3 and 6), the distal longitudinal end 26a of the distal elongate component 26 extends into the interior 20a of the central hub 20, while the proximal longitudinal end 26b thereof remains coupled to a distal end 27a of the central elongate component 27. The proximal end 27b of the central elongate component 27 remains coupled to a distal end 28a of the proximal elongate component 28, while the proximal longitudinal end 28b of the proximal elongate component 28 is in the interior 14a of nacelle 14.

Figure 3:
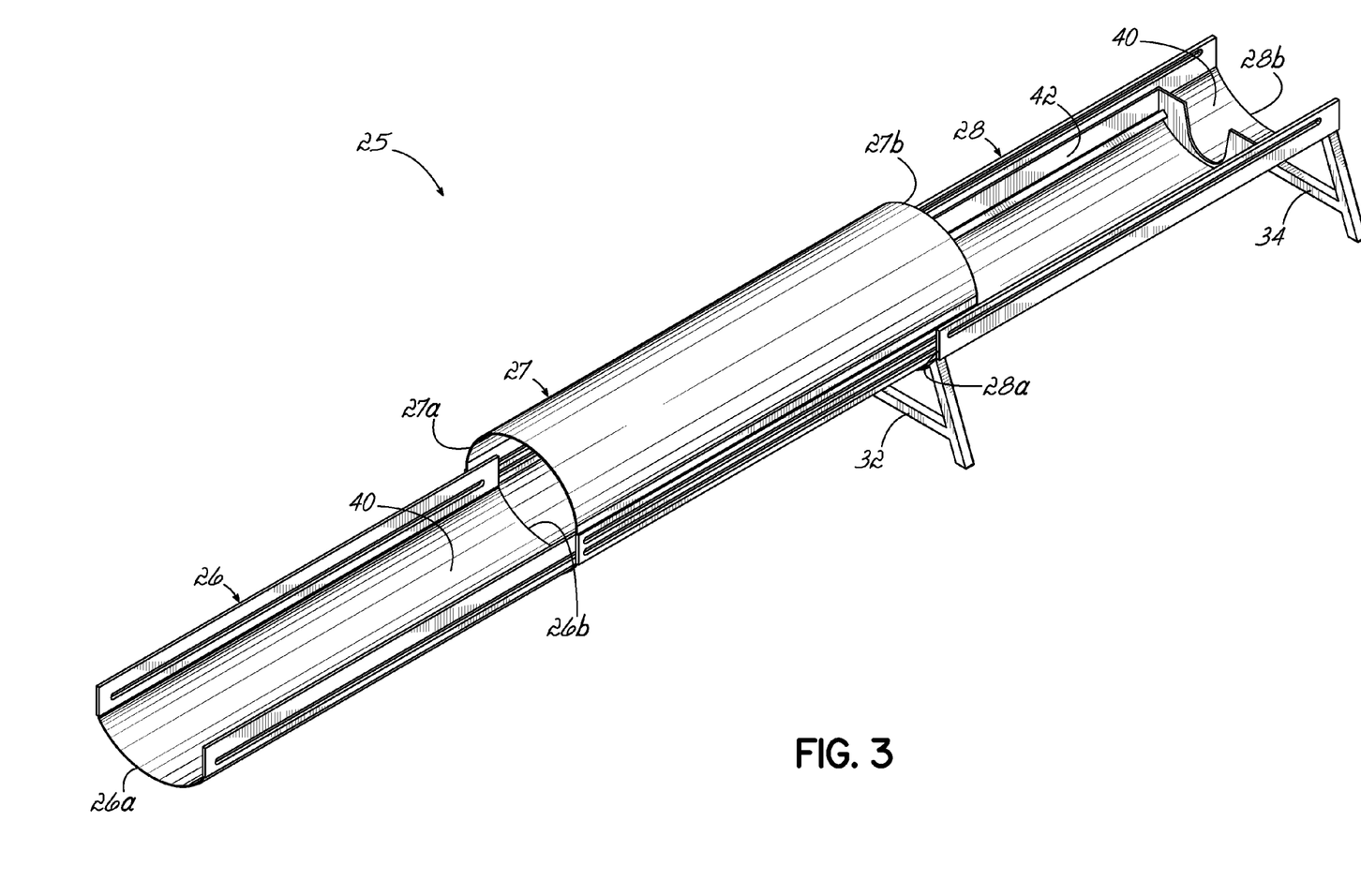
FIG. 3 illustrates an exemplary embodiment of a transport conduit usable in the wind turbine of FIGS. 1 and 2 and in an extended condition.
Figure 4:
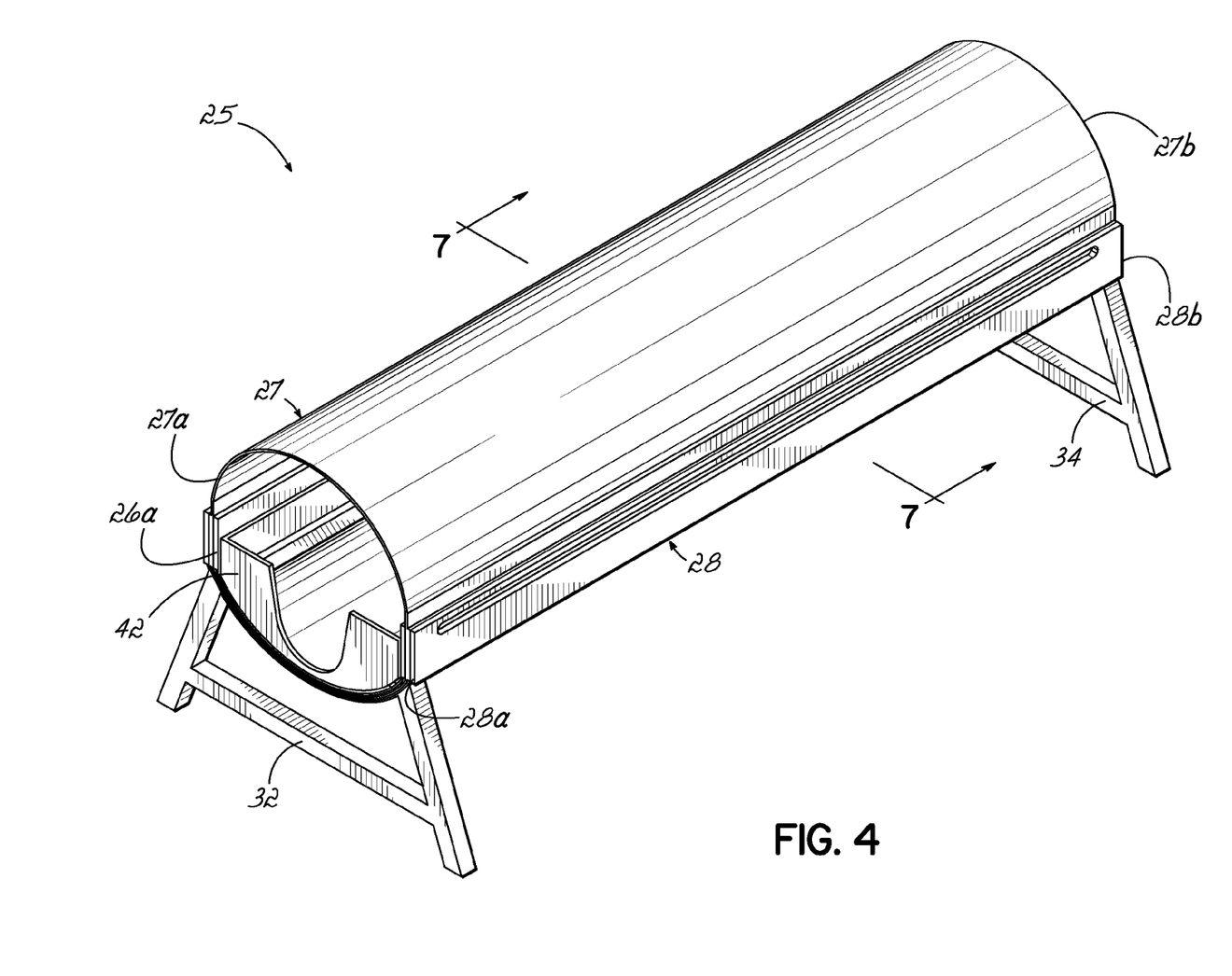
FIG. 4 illustrates the transport conduit of FIG. 3 in a collapsed, unextended condition.
Figure 5:
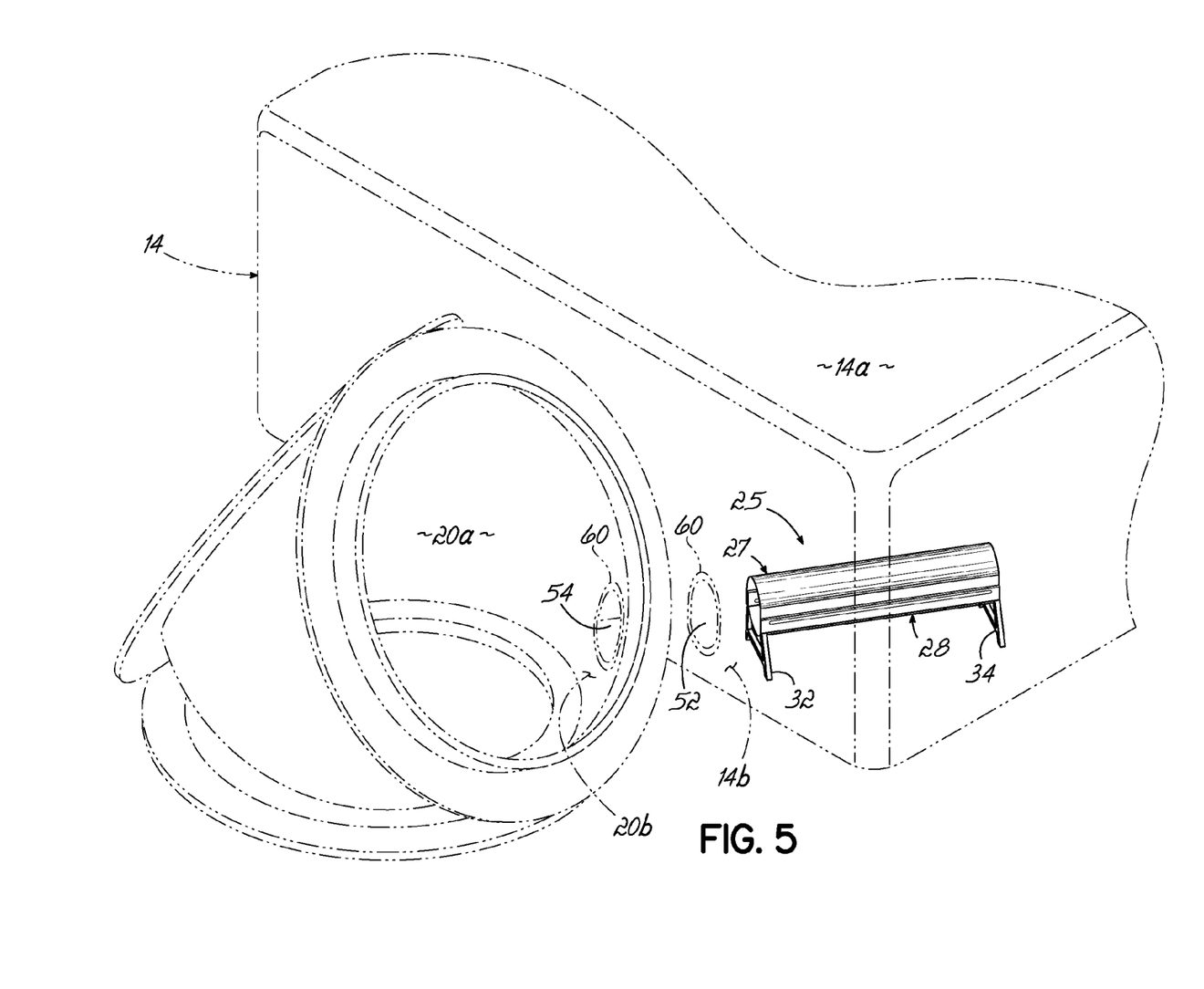
FIG. 5 is a perspective view of the transport conduit of FIGS. 3 and 4 within the nacelle shown in FIG. 2.

With particular reference to FIGS. 2-7, the proximal elongate component 28 of transport conduit 25 remains in place within the nacelle 14 when the transport conduit 25 is in the extended condition. During deployment, the central and distal elongate components 26, 27 are slidably moved relative to the proximal elongate component 28 and relative to one another so as to generally attain a deployed condition in which objects (even persons such as technicians) may be transported from the proximal longitudinal end 28b to the distal longitudinal end 26a within the central hub 20. In addition to the above, the proximal elongate component 28 is supported within the nacelle 14 by a pair of longitudinally opposed supports or stands 32, 34. The proximal elongate component 28 may be fixedly or removably secured to the support structure of the nacelle 14 (not shown). For example, the stands 32, 34 may be bolted, welded or otherwise secured to nacelle 14. In an alternative embodiment, the proximal elongate component 28 may only be supported in the nacelle 14 by stands 32, 34 without being fixedly secured thereto. In one aspect of the illustrated embodiment, the central and distal elongate components 26, 27 are supported by the proximal elongate component 28 in cantilever fashion, as best shown in FIG. 3. More particularly, the central elongate component 27 may be supported by the proximal elongate component 28 in cantilever fashion, and the distal elongate component 26 may be supported by central elongate component 27 in cantilever fashion.

The transport conduit 25 includes a generally U-shaped channel (in cross section) 40 that spans along all three of the elongate components 26, 27, 28. The channel 40 is configured to receive therein a cart 42 that, in this exemplary embodiment, has one or more pairs of wheels 43 (one pair shown) and is thus able to roll on those wheels 43 along the channel 40 between the interior 20a of the central hub 20 and the interior 14a of the nacelle 14. Alternative embodiments are contemplated, however, in which the cart 42 is not wheeled but is nevertheless configured to travel along the channel 40 while supporting one or more objects being transported between the interior 20a of the central hub 20 and the interior 14a of the nacelle 14. The transport conduit 25 is illustrated in the figures as having a generally horizontal orientation, though it is contemplated that it may instead be permanently or even selectively inclined so as to facilitate travel of the cart 42 along channel 40 toward the intended destination, e.g., the interior 20a of central hub 20. More specifically, while not shown, the transport conduit 25 may include a mechanism, such as one including an electric motor and/or hydraulic components, configured to selectively change the orientation of the transport conduit 25 by a user, according to the desired direction of travel of the objects (i.e., toward the interior 20a of central hub 20 or away from the interior 20a and toward the interior 14a of nacelle 14).

Figure 6:
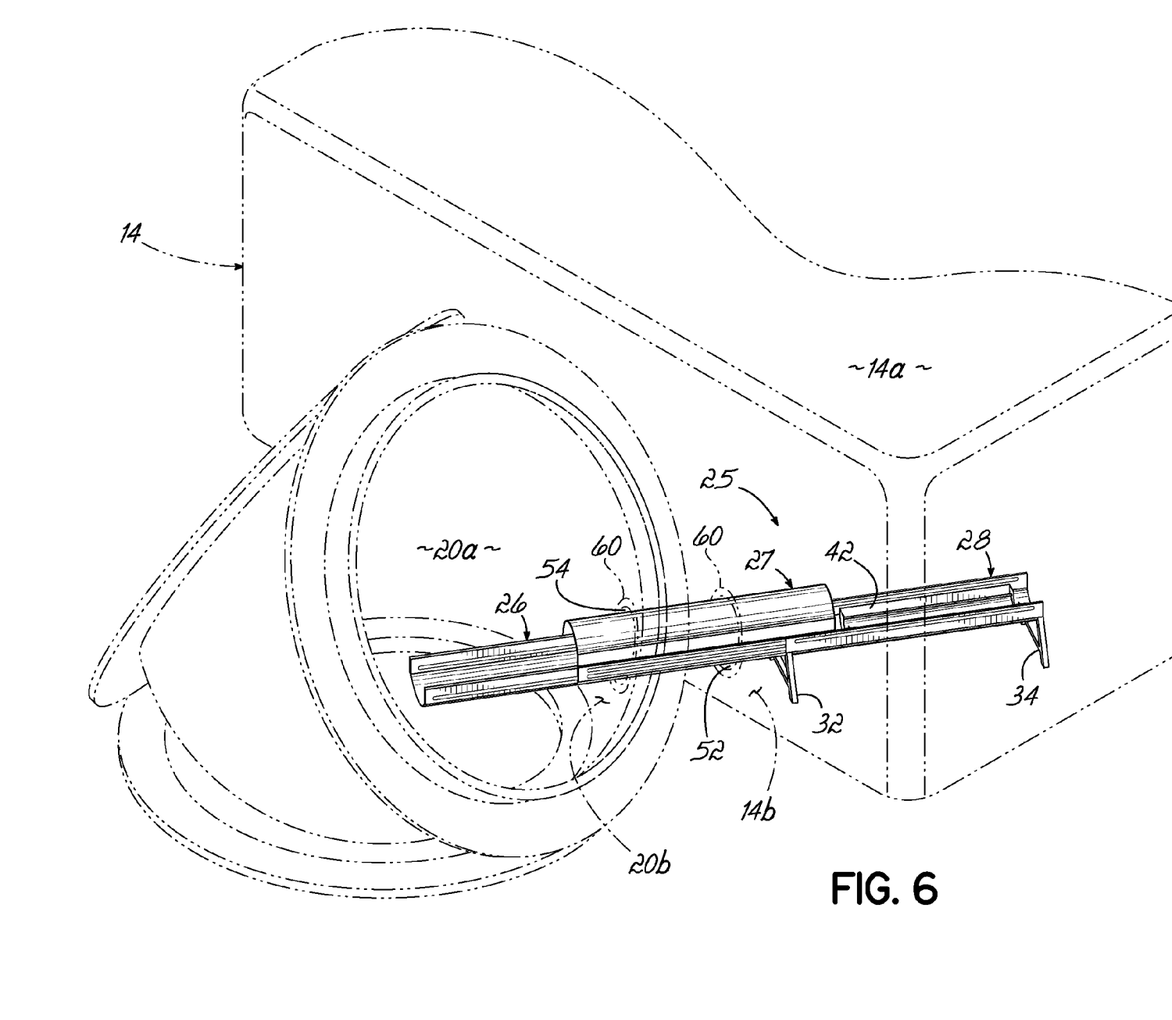
FIG. 6 is a perspective view of the transport conduit of FIG. 5 in a deployed, extended condition, extending into the rotor hub.

With particular reference to FIGS. 5 and 6, deployment of the transport conduit 25 includes extending at least the distal elongate component 26 through a pair of apertures 52, 54 respectively formed through generally confronting walls 14b, 20b defining the nacelle 14 and central hub 20. To this end, one or both of the walls 14b, 20b may be reinforced in the areas adjacent the apertures 52, 54, through a reinforcement 60, schematically depicted in FIGS. 5 and 6, and which may take the form of reinforcing plates, for example, or relative thick wall portions so as to maintain the structural integrity of the walls 14b, 20b despite the presence of the apertures 52, 54. The wind turbine 10 may further include doors, hatches or other closure members (not shown) to selectively close off the nacelle 14 and hub 20 when the transport conduit 25 is not in use. While FIG. 6 illustrates the entirety of distal elongate component 26 and a portion of the central elongate component 27 being located within the interior 20a of the central hub 20 when the transport conduit 25 is in the extended, deployed condition, this is intended to be merely exemplary rather than limiting. Specifically, in an alternative embodiment, only the distal elongate component 26 or a part thereof may be located in the interior 20a of central hub 20 when the transport conduit 25 is in its extended, deployed condition.

Once the exemplary transport conduit 25 is deployed, the central elongate component 27 is exposed to the exterior of the wind turbine 10 in the space or gap separating confronting portions of the central hub 20 and the nacelle 14. In this regard, the central elongate component 27 is completely enclosed, thus taking on a cylindrical-tubular shape that prevents debris and other matter from accessing the channel 40 of transport conduit 25. This complete enclosure of channel 40 thus facilitates maintaining the channel 40 free of matter that would otherwise hinder movement of the cart 42 there along. Additionally, the enclosed configuration of central elongate component 27 also prevents items traveling through transport conduit 25 from falling out of channel 40, thereby mitigating or eliminating safety concerns with objects falling from the wind turbine 10. Although the exemplary embodiment shows only central elongate component 27 being enclosed, it should be realized that the other elongate components may be enclosed as well (not shown).

Figure 7:
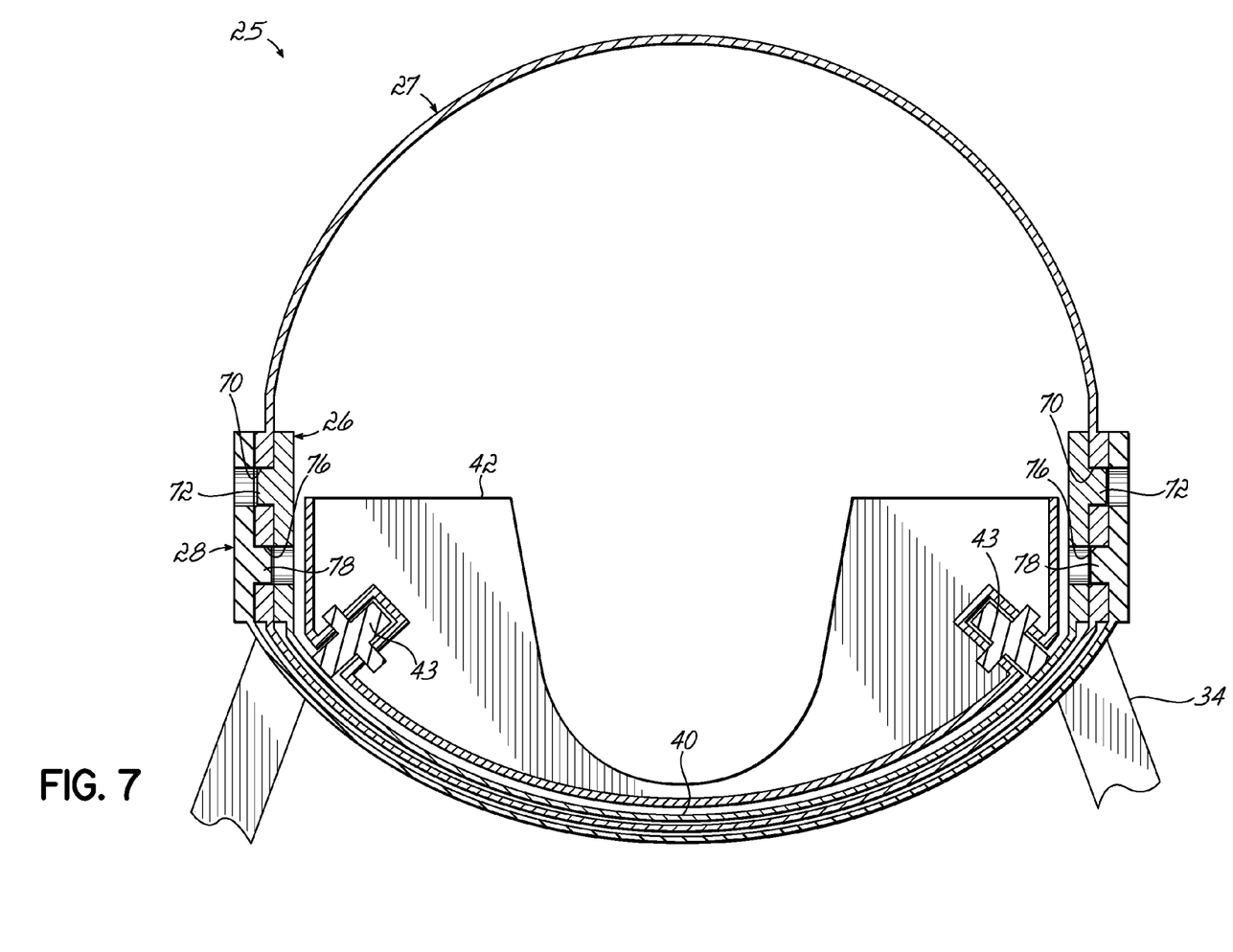
FIG. 7 is a cross-sectional view taken generally along line 7-7 of FIG. 4.

FIG. 7 illustrates additional details of the exemplary transport conduit 25. That figure illustrates the transport conduit 25 in its collapsed, undeployed condition. In that condition, the distal elongate component 26 is shown being inboard of the central elongate component 27, and the central elongate component 27 is shown inboard of the proximal elongate component 28. Slidable movement of the elongate components 26, 27, 28 while maintaining coupling of those components relative to one another is facilitated by suitably chosen features. In the illustrated embodiment, and as a matter of example, the central elongate component 27 has a pair of inward-facing slotted channels or grooves 70 that receive a corresponding pair of male elements 72 of the distal elongate component 26 there along. A pair of outward-facing slotted channels or grooves 76 of the central elongate component 27 receive there along a pair of male elements 78 of the proximal elongate component 28. Relative movement of the elongate components 26, 27, 28 thus includes slidable movement of the above-noted male elements 72, 78 respectively along the grooves 70, 76.

In another aspect of the embodiment shown in FIG. 7, the wheels 43 are disposed so as to rest on the distal elongate component 26 when the transport conduit 25 is in its collapsed, undeployed condition. Those of ordinary skill in the art will readily appreciate, however, that the arrangement of the elongate components 26, 27, 28 relative to one another in the illustrated embodiment is intended to be exemplary rather than limiting, insofar as other arrangements are contemplated. Other arrangements may in some embodiments result in the wheels 43 resting on one of the elongate components 27, 28 instead of resting on the distal elongate component 26 when the transport conduit 25 is in the collapsed, undeployed condition. It should be realized that when transport conduit 25 is in its extended condition, there may be a small bump or lip at the transition between elongate components 26, 27, 28. Such a lip, however, is considered small relative to, for example, the radius of wheels 43 such that the cart 42 is not significantly impeded as it moves along the channel 40 of transport conduit 25.

Also, while the wheels 43 are shown in an angled orientation, and in a number of two, it is contemplated that they may instead have any other orientation and be present in a number other than two. In this regard, it is contemplated that in an alternative embodiment the transport conduit 25 may have no wheels at all and instead rely on a different type of feature providing relatively smooth movement between the cart 42 and channel 40. Moreover, while the coupling between elongate members 26, 27, 28 is effectuated through male elements 72, 78 and grooves 70, 76, other arrangements are possible. For example, and without limitation, an alternative embodiment of a transport conduit 25 may rely on bearings coupled to the male elements 72, 78 and/or to the grooves 70, 76.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of the general inventive concept.

What is claimed is:

1. A wind turbine, comprising:
   a tower;
   a rotor hub supported by the tower;
   at lease one blade extending from the rotor hub;
   a nacelle coupled to the tower and proximate the rotor hub; and
   a transport conduit selectively providing communication between an interior of the nacelle and an interior of the rotor hub, wherein the transport conduit has a collapsed condition in which the transport conduit is located completely within the nacelle, and an extended condition in which the transport conduit partially extends into the interior of the rotor hub, and wherein the transport conduit extends along a longitudinal axis that is spaced from a rotational axis of the rotor hub when in the extended condition.

2. The wind turbine of claim 1, wherein the transport conduit is a telescopic structure.

3. The wind turbine of claim 2, wherein the transport conduit has at least two elongate components telescopically movable relative to one another.

4. The wind turbine of claim 3, wherein a first elongate component is fixedly coupled to the nacelle and a second elongate component is cantilevered to the first elongate component.

5. The wind turbine of claim 4, wherein a third elongate component is cantilevered to the second elongate component.

6. The wind turbine of claim 3, wherein at least one of the elongate components defines a closed channel.

7. The wind turbine of claim 6, wherein an exterior of the closed channel is exposed to an exterior of the wind turbine when in the extended condition.

8. The wind turbine of claim 3, wherein at least one of the elongate components also defines an open channel.

9. The wind turbine of claim 1, wherein the transport conduit includes a channel and a cart configured to receive objects thereon and to move along the channel for moving the objects between the nacelle and the rotor hub.

10. The wind turbine of claim 9, wherein the channel has a U-shaped profile.

11. The wind turbine of claim 1, wherein the transport conduit extends through an aperture in the rotor hub.

12. The wind turbine of claim 11, wherein the transport conduit extends through an aperture in a wall of the nacelle.

13. A method of transporting an object into an interior of a rotor hub of a wind turbine, the wind turbine also having at least one blade extending from the rotor hub, a tower supporting the rotor hub, and a nacelle proximate the rotor hub, the method comprising:
- accessing the interior of the nacelle so as to position the object in the nacelle;
- configuring a transport conduit, which is initially in a collapsed condition and located completely within the nacelle, in an extended condition in which the transport conduit extends from an interior of the nacelle to an interior of the rotor hub along a longitudinal axis that is spaced from a rotational axis of the rotor hub; and
- moving the object along the transport conduit from the interior of the nacelle to the interior of the rotor hub.

14. The method of claim 13, further comprising:
- telescopically extending the transport conduit into the interior of the rotor hub.

15. The method of claim 13, further comprising:
- collapsing the transport conduit so as to be contained entirely within the interior of the nacelle.

16. The method of claim 13, wherein moving the object along the transport conduit includes supporting the object on a cart and moving the cart along a channel defined by the transport conduit to thereby move the object between the nacelle and the rotor hub.

* * * * *